Nov. 27, 1956  C. C. LAURITSEN  2,771,818
ROCKET LAUNCHER
Original Filed Feb. 3, 1945  3 Sheets-Sheet 1

INVENTOR
CHARLES C. LAURITSEN
BY
ATTORNEY

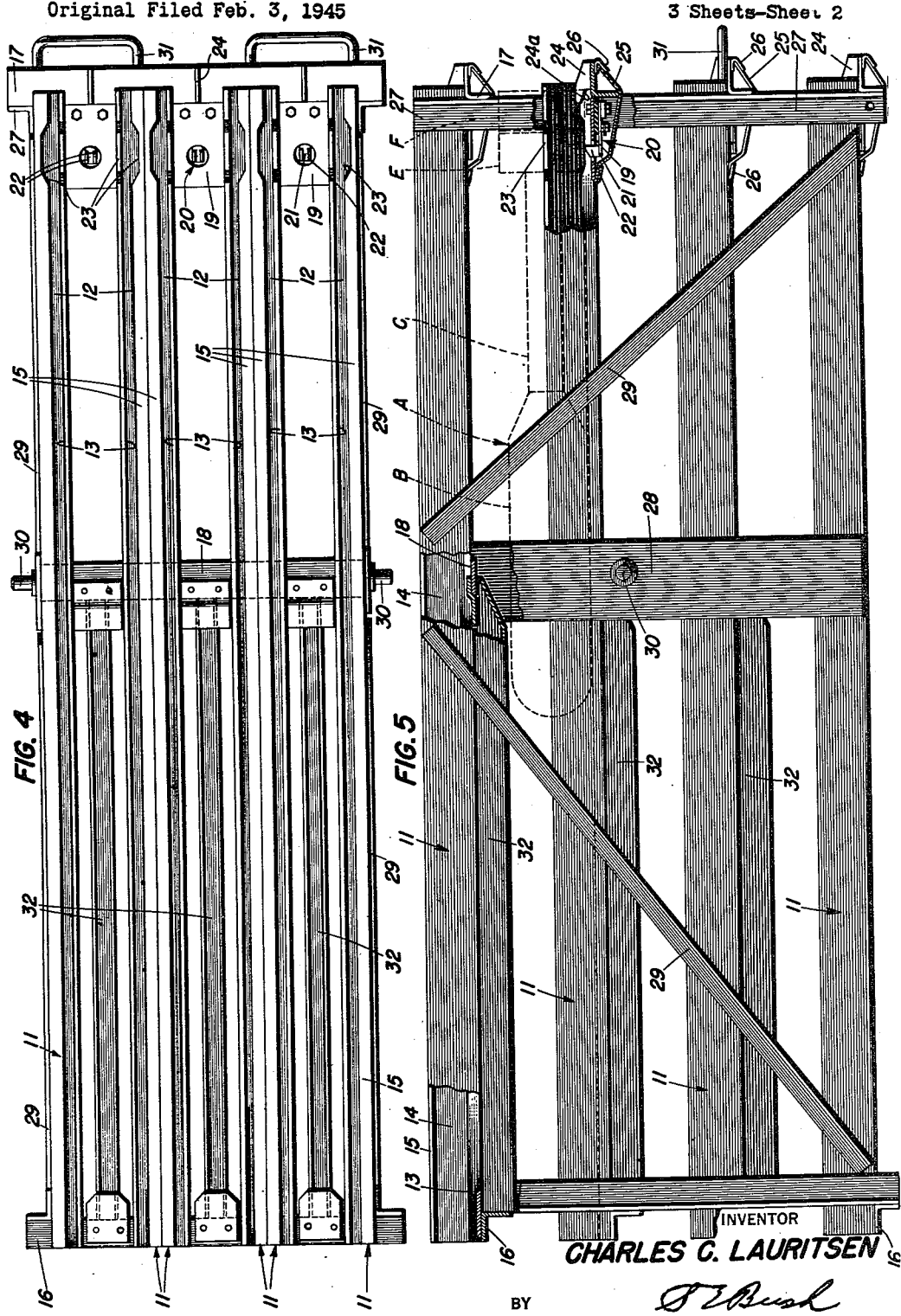

Nov. 27, 1956   C. C. LAURITSEN   2,771,818
ROCKET LAUNCHER

Original Filed Feb. 3, 1945   3 Sheets-Sheet 3

INVENTOR
CHARLES C. LAURITSEN
BY
ATTORNEY

United States Patent Office 2,771,818
Patented Nov. 27, 1956

2,771,818

ROCKET LAUNCHER

Charles C. Lauritsen, Pasadena, Calif., assignor to the United States of America as represented by the Secretary of the Navy Continuation of application Serial No. 576,118, February 3, 1945. This application April 29, 1952, Serial No. 285,003

6 Claims. (Cl. 89—1.7)

This application constitutes a continuation of copending parent application of Charles C. Lauritsen, Serial No. 576,118, filed on February 3, 1945, for Rocket Launcher, and now abandoned.

This invention relates to rocket launchers, and more particularly to multiple track rocket launchers.

One object of the invention is to provide a rocket launcher having a simple launching track construction which not only forms a guide for the rocket device, but also insures adequate clearance around the rocket device throughout the length of the track for free escape of the rocket blast.

Another object of the invention is to provide a rocket launcher which has a launching position and a stowed position and is easily movable between the two positions.

Another object of the invention is to provide a rocket launcher which is particularly suited for mounting on various combat vehicles, such as on landing support boats outboard of the cockpit.

Another object of the invention is to provide a rocket launcher which is readily and quickly fabricated from standard structural sections of sheet material and which lends itself to welded construction.

Another object of the invention is to provide a rocket launcher which is particularly adapted for use with electrically fired rockets of the type disclosed in my copending patent application Serial No. 481,645, filed April 2, 1943, now Patent No. 2,469,350.

These and other objects of the invention will be apparent from the following specification and the accompanying drawings, in which:

Fig. 4 is a plan view of the launching tracks of the device;

Fig. 5 is a side elevational view of the launching tracks of the device; and

Figure 1:
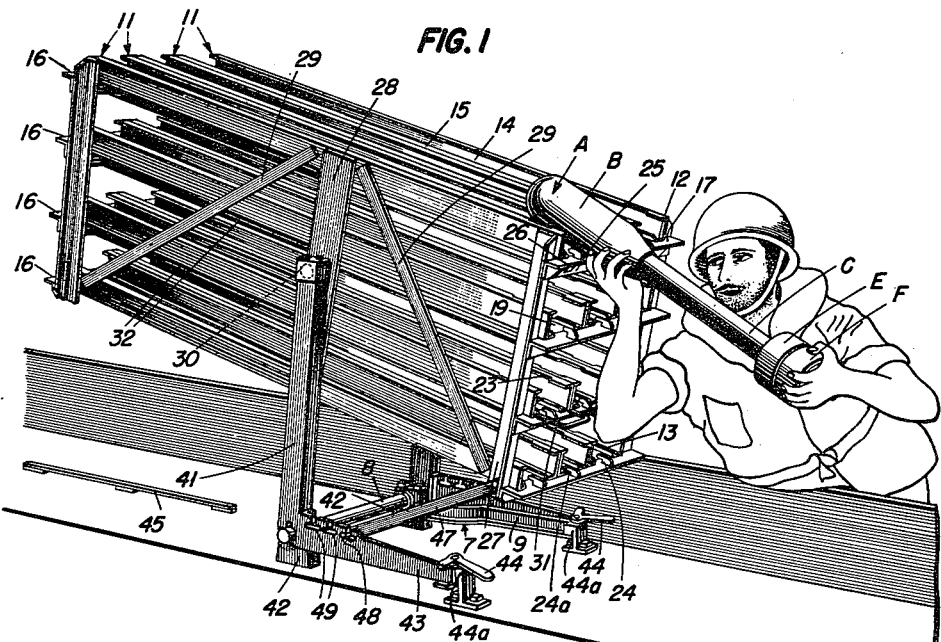
Fig. 1 is a perspective view of the rocket launcher mounted on a support boat in operating position.
Figure 3:
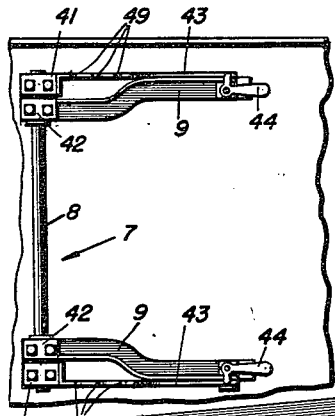
Fig. 3 is a detailed plan view of the device for retaining the launcher support in operating position.

The rocket launcher, as shown in the drawings, comprises generally a platform on which is supported a bellcrank mount, and a rail assembly carried by the mount and comprising a plurality of track units suitably arranged in sets of several side by side, the sets positioned one above another and spaced by suitable framework. Platform 7 may be fastened to a deck, for example, and is provided with a rod 8 at the outer ends of which may be pivoted the bellcrank mount. Platform side members 9 are connected to the outer portion of the rod and extend horizontally and rearwardly so as to add rigidity to the platform design.

Each track unit is made up of a pair of L-shaped rail members 11 having horizontal portions 12 which face inwardly toward each other and terminate in upturned base ribs 13. The upper ends of the vertical portions 14 of the L-rails are turned inwardly toward each other to form side ribs 15.

Figure 6:
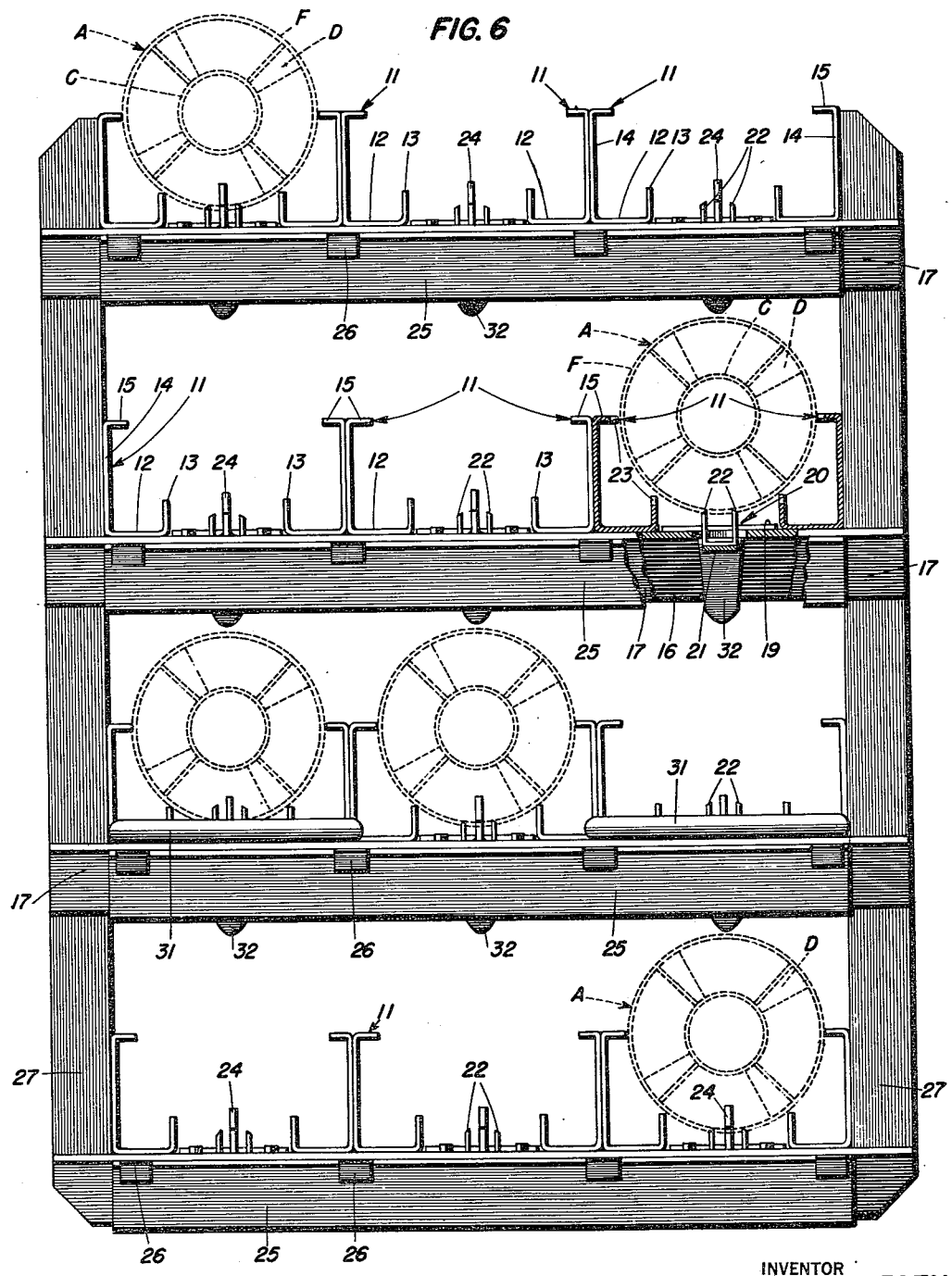
Fig. 6 is a rear elevational view of the launching tracks of the device.

A rocket device A, such as is disclosed more fully in the aforementioned patent application, rests on the bottom or base ribs 13 between the side ribs 15 as indicated by dotted lines in Fig. 6. The rocket devices are preferably electrically operated and comprise a bomb case B, a rocket motor C directed rearwardly therefrom, radiating tail fins D at the rear extremity of the motor, and a pair of rings E and F supported by the fins D, one of said rings being grounded and the other insulated. The rings thus form terminal means for electrical communication between the motor C and a control circuit (not shown).

It will be observed that the L-shaped rail members 11 with their bottom and side ribs 13 and 15 provide ample radial clearance on all sides of each rocket device. This insures proper escape of the rocket blast without affecting the operation of the other rocket devices remaining in the launcher.

Three or any suitable number of tracks are positioned side by side with the rails of adjacent tracks back to back, the tracks being secured at their forward and rear ends to angle members 16 and 17 and to an intermediate cross plate 18.

The tracks are also connected by a contact cover plate 19 adjacent the rear cross member 17. Secured to the underside of the cover plate 19 in centered relation with each track is a contact assembly 20, which includes a spring arm 21 insulated from the tracks and supporting at its free end a double contact member 22 having knifeedge contacting portions adapted to engage the insulated ring E of the rocket device. The bottom ribs 13 and side ribs 15 are notched at 23 to clear the insulated band E when the rocket device is in position.

The rear cross member 17 carries a grounding contact 24 for each track, the grounding contact being notched at 24a on its forward edge to engage the inner rear edge of the ring F of the rocket device. A bottom cover plate 25 held by lugs 26 at its forward and rear edges extends under the contact assemblies.

Four or any convenient number of sets of tracks are supported one above another by corner posts 27 and a pair of intermediate side plates 28, the assembly being reinforced by diagonal braces 29.

The intermediate side plates 28 are provided with outwardly extending journals 30 capable of supporting the entire framework formed by the tracks, cross members and corner posts. The axis of rotation defined by the journals 30 is forward of and above the center of gravity of the framework so that the rear end tends to tip downwardly. The balance is such, however, that one man can readily tilt the entire projector. Handles 31 are provided at the rear end of the projector for this purpose.

In order to prevent movement of the rocket devices upwardly away from their tracks and assure unobstructed launching of the rocket devices, guide ribs 32 are secured to the intermediate and forward cross members 16 and 18 in a central position over each track. The uppermost set of tracks does not require the guide ribs 32, as the amount of movement, if any, away from the tracks is small and there is no structure above the upper tracks which might obstruct the launching of rocket devices from the upper tracks. The ribs 32 are U-shaped in cross section and their rear edges are beveled to assist in guiding the rocket devices into launching position at the time of loading the launcher. Preferably, the ribs 32 extend rearwardly far enough to overlap the rocket device, as indicated by dotted lines in Fig. 5, thus assuring that the rear end of rib 32 does not obstruct the flight of a rocket device launched from the structure.

The journals 30 are mounted in the upper extremities of supporting L-shaped bellcranks 41. Each of the bellcranks are attached at a point intermediate the bellcrank extremities to suitable deck mountings 42 which serve as the fulcrum points for bellcrank 41. The vertical legs of the L-shaped bellcranks 41 are provided with right-angularly directed horizontal legs 43 which extend rearwardly from the vertical legs to complete the L-shaped bellcrank design. The extremities of these legs 43 are engaged by suitable latches 44 mounted on the deck by suitable means such as fittings 44a when the launcher is in its elevated or operating position. When the latches are disengaged, the launcher may be lowered to the position shown in Fig. 2 by raising the handles 31 until the forward end of the projector touches the deck, or preferably a guide rail 45. The launcher is then moved forward, the bellcranks 41 pivoting about the deck mountings 42 until the launcher is in its stowed position as shown in Fig. 2.

The launcher may be positioned at various elevations by means of a link 47 which is pivoted to the lower end of corner post 27 and carries a pin 48 at its other end for engaging keyhole slots 49 in the upper edge of the bellcrank outboard positioned leg 43 when the launcher is in its operating position. The slots 49 are spaced along the upper edge of bellcrank leg 43 so that considerable variation in the angle of elevation of the launching tracks is possible. Other convenient means for adjusting the elevation of the launcher tracks may be used in place of the link 47 if desired.

Figure 2:
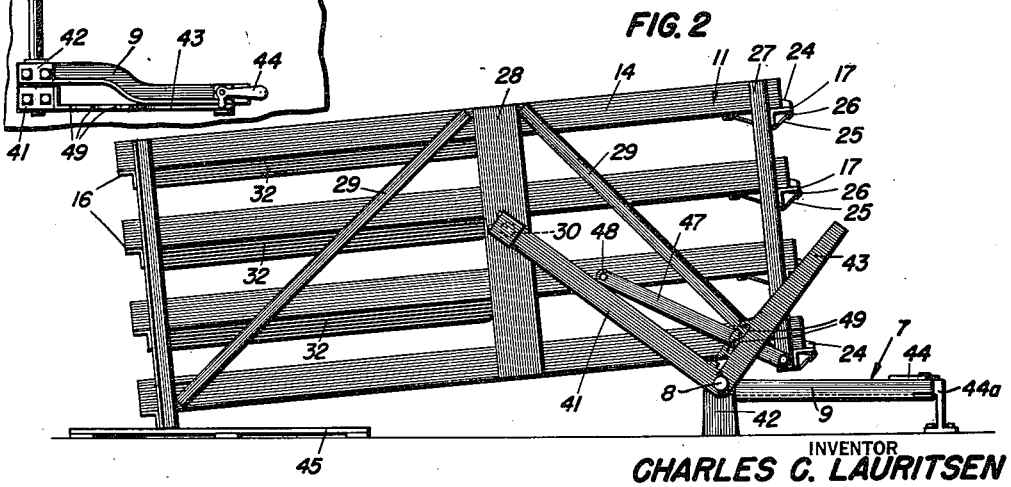
Fig. 2 is a side elevational view of the launcher in its stowed position.

In operation, with the launcher in its stowed position as shown in Fig. 2, the operator grasps handles 31 and with an upwardly and rearwardly directed pull, moves the launcher to the operating position shown in Fig. 1. Latches 44 are then moved to a retaining position to hold the launcher in the operating position. The launcher is loaded by inserting the rocket devices onto the rails from the rear as shown in Fig. 1, the rockets being pushed past the retainer contact 24 and then pulled rearwardly until the contact ring F of the rocket engages the notch 24a in the forward edge of the ground contact 24. In this position, contact 22 engages contact ring E and the rocket device may be launched by closing a suitable circuit (not shown) connected to contacts 22 and 24. To vary the range of the rocket devices, the elevation of the launcher tracks may be varied by moving the pin 48 on the lower end of link 47 to the desired notch 49 in bellcrank leg 43.

When it is desired to return the launcher to its stowed position, latches 44 and pin 48 are disengaged and the operator pushes upwardly and forwardly on handles 31, lowering the forward end of the launcher onto guide rail 45 and then sliding the device forwardly to its stowed position as shown in Fig. 2. It is desirable to be able to move the launcher to the stowed position in order to remove the possibility of its interfering with vision or field of fire from within the boat carrying the launcher.

What is claimed is:

1. Mount means for supporting a launcher assembly for elongated rockets for movement from a stowed position resting on a deck to a raised loading and firing position with all parts thereof out of contact with the deck comprising, a platform having horizontally disposed longitudinally extending side members, support mountings connected to the forward portion of said platform and fittings connected at the rearward portion of the platform to the side members of said platform such that the platform is caused to lie in a horizontal plane, latches pivotally connected to said fittings, a pair of transversely spaced and aligned bellcrank levers having L-shaped leg members connected for movement together and pivotally connected at the point of juncture of the legs of the L-shaped bellcrank to the platform support mountings for rotation in parallel vertical planes when the mount is moved from a stowed position to a firing position, one pair of upstanding bellcrank legs arranged to pivotally engage opposite sides of a rocket launcher rail assembly near the center thereof to provide a trunnion therefor so as to permit movement of the rocket launcher rail assembly in elevation, said trunnion being located forward of the pivotal connection between the juncture point of the legs of the bellcrank levers and the platform support mountings when the rail assembly is in a stowed position and said trunnion being located above said pivotal connection between the juncture of the legs of the L-shaped bellcrank levers and the forward platform supporting mountings when the rail assembly is in firing position, the horizontal leg set of the L-shaped bellcrank extending to the rear and engaging the deck when the rocket launcher assembly is in the raised firing and loading position, said latches being provided for anchoring the latter legs to the deck during the rocket firing and loading operations, and means for locking the assembly in a plurality of elevated positions, said last-mentioned means including a link pivotally connected to said rail assembly for rotation in a vertical plane to be connected with at least one of said rearwardly extending bellcrank legs at one of a plurality of predetermined points along the length thereof in accordance with the desired elevation setting of the launcher rail assembly, the rear end of the rocket launcher assembly in the loading position being spaced from the deck so as to permit the loading of elongated rockets therein from the rear even while the rocket launcher rail assembly is in a position of extreme elevation.

2. A mount means for supporting a rocket launcher assembly in a stowed position and in a firing position having a plurality of predetermined angles of elevations, comprising a platform, said platform having horizontal, longitudinally extending side members, mountings for supporting the forward portion of said platform, fittings positioned at the rearward portion of the platform for supporting said platform side members, latches pivotally connected to said fittings, a rocket launcher rail assembly, a pair of L-shaped bellcranks, said bellcranks having a horizontal leg and a vertical leg and being disposed laterally outward of the longitudinally extending platform side members and pivotally connected at the junction of the legs of the L-shaped bellcranks to said platform mountings for rotation in substantially parallel vertical planes, said rail assembly being pivotally connected to one end portion of each bellcrank for rotational movement about a first substantially horizontal axis, said one end portion of each bellcrank being located forward of the junction point of the legs thereof when the rail assembly is in a stowed position and above the junction point of the legs thereof after the rail assembly has been moved rearwardly to the firing position, the other end portion of each bellcrank being free to describe an arc as the launcher is moved from a stowed position to a firing position, said other end portion of each bellcrank further including a notched area between said pivotal connection at the junction of the legs of the L-shaped bellcranks and the end thereof, said latches securing said other end portion of each bellcrank in a horizontal firing position, and a link pivotally connected to the rail assembly for rotational movement about a second horizontal axis and connectable with said notched area of said bellcranks to thereby rotate the rail assembly about said first horizontal axis to a plurality of predetermined angles of elevation.

3. A rocket launcher comprising a platform, a rocket launcher rail assembly, means pivotally connected to said platform for rotation in a substantially vertical plane as said rail assembly is moved rearwardy from a stowed position to a firing position, said rail assembly being pivotally connected to said means for rotational movement about a first substantially horizontal axis as said rail assembly is moved rearwardly from a stowed position to a firing position and said means is moved in said vertical plane, said first axis being located forward of said platform when the rail assembly is in stowed position and above the platform when the rail assembly is in firing position, latching means for securing said means to the platform when the rail assembly is in firing position, elevating means pivotally connected with the rail assembly for rotation about a second substantially horizontal axis and connectable with the first mentioned means for adjusting the angle of elevation of the rail assembly by effecting further rotation of the latter about said first axis, said rail assembly including a plurality of tracks, each of said tracks having a pair of transversely spaced L-shaped rail members respectively facing inwardly toward one another, the base portion of each rail member being upturned at the end thereof to present an upstanding bottom rib, the vertical portion of said L-shaped rail members being turned inwardly toward one another to present side ribs, an electric contact for engagement with the insulated ring of a rocket device to be launched, said bottom and side ribs being notched adjacent the rearward ends thereof for providing clearance for the insulated ring of a rocket device in loaded position, means for supporting a plurality of such rail assemblies in engagement with one another along the outer surface of the longitudinally extending L-shaped rail members to form a plurality of horizontal rows and for supporting a plurality of such rows in vertically spaced relation, a plurality of grounding contacts carried by said last means and respectively positioned for engagement with the grounding ring of the rocket device in loaded position, said grounding contacts respectively being provided with a notched portion for facilitating said engagement with the grounding ring, and a depending longitudinally extending and centrally disposed U-shaped rib for each rail assembly and each vertically spaced row of rail assemblies below the uppermost row for assuring unobstructed launching of the rocket devices.

4. A rocket launcher comprising a platform, said platform having horizontal, longitudinally extending platform side members, mountings supporting said platform members at the forward portion of the platform, and rearward fittings supporting said members at the rear portion of said platform, latches pivotally connected to said rearward fittings, a rocket launcher rail assembly, a pair of bellcranks each being formed with a vertical leg and a horizontal leg and disposed laterally outward of the longitudinally extending platform side members and pivotally connected at the junction of the bellcrank legs to said forward platform mountings for rotation in substantially parallel vertical planes, said rail assembly being pivotally connected to one end portion of each bellcrank for rotational movement about a first substantially horizontal axis, said one end portion of each bellcrank being located forward of the junction of the legs thereof when the rail assembly is in a stowed position and above the junction of the legs thereof after the rail assembly has been moved rearwardly to the firing position, the other end portion of each bellcrank being free to describe an arc as the launcher is moved rearwardly from a forward stowed position to a firing position, said other end portion of each bellcrank further including a notched area between said pivotal connection at the junction of the legs of the bellcrank and the end thereof, said latches securing said other end portion of each bellcrank in a horizontal firing position, a link pivotally connected to the rail assembly for rotational movement about a second horizontal axis and connectable with said notched area of said bellcranks to thereby rotate the rail assembly about said first horizontal axis to a plurality of predetermined angles of elevation, said rail assembly including a plurality of tracks, each of said tracks having a pair of transversely spaced L-shaped rail members respectively disposed to face one another, the base portion of each rail member being upturned at the end thereof to present an upstanding bottom rib, the vertical portions of said L-shaped rail members being turned inwardly toward one another to present side ribs, and electric contact for engagement with the insulated ring of a rocket device to be launched, said bottom and side ribs being notched adjacent the rearward ends thereof for providing clearance for the insulated ring of a rocket device in loaded position, means for supporting a plurality of such rail assemblies in engagement with one another along the outer surfaces of the longitudinally extending L-shaped rail members to form a plurality of horizontal rows of rail assemblies and for supporting a plurality of such rows in vertically spaced relation, a plurality of grounding contacts carried by said last means and respectively positioned for engagement with the grounding ring of the rocket device in loaded position, said grounding contacts respectively being provided with a notched portion for facilitating engagement with the grounding ring, and a depending longitudinally extending and centrally disposed U-shaped rib for each rail assembly below the uppermost row of rail assemblies for assuring unobstructed launching of the rocket devices.

5. A rocket launcher mount means for supporting a launching rail assembly in selectable elevational firing positions and in a stowable position comprising; a platform provided with a rod and with longitudinally extending horizontal side members connected to the outer portions of the rod, support mountings connected to said platform rod such that the rod is carried in a horizontal plane, fittings connected to the platform side members in such a manner that the side members are caused to lie in the horizontal plane which includes the rod, an L-shaped bellcrank having a vertical leg and a horizontal leg and disposed laterally outward of a platform side member and pivotally connected to said rail assembly at the extremity of the vertical leg so as to support the rail assembly for rotation about a first horizontal axis, said bellcrank at a point intermediate the extremities being pivotally fastened to the platform support mountings in a manner so as to provide a bellcrank fulcrum for rotation of the bellcrank about a second horizontal axis whereby said rail assembly may be pivoted about the bellcrank and said first axis and said rail assembly and the bellcrank as a unit may be pivotally elevated about the platform support mountings and said second axis to thereby move the rail assembly from firing position to stowed position and vice versa, the horizontal leg of the L-shaped bellcrank being formed with notches therein, latches mounted on said platform side member support fittings for removably engaging the horizontal leg of the L-shaped bellcrank so as to retain the bellcrank in a position fixed with respect to said platform, and means associated with said rail assembly and the bellcrank member for fixedly retaining said rail assembly at a given angle of rotation about said first axis with respect to the bellcrank, said last-mentioned means including a link pivotally connected to said rail assembly for rotation about a third horizontal axis and adapted to engage one of said notches on the horizontal leg of the L-shaped bellcrank, said first axis being located forward of said second axis when the rail assembly is in stowed position and being movable rearwardly through an arc to a position above said second axis when the rail assembly is in firing position.

6. A rocket launcher mount means for independently raising a launching rail assembly out of contact with a supporting surface and enabling said rail assembly to be rotated in elevation while out of contact with said supporting surface and thereafter fixed at a given elevation angle with respect to said surface comprising; a platform provided with a rod and with longitudinally extending horizontal side members connected to the outer portions of the rod, support mountings connected to said platform rod such that the rod is carried in a horizontal plane, fittings connected to the platform side members in such a manner that the side members are caused to lie in the horizontal plane which includes the rod, an L-shaped bellcrank having a vertical and a horizontal leg and positioned intermediate said rail assembly and the platform and fastened to both the rail assembly and the platform by separate horizontal pivotal connections enabling said rail to be pivoted about said bellcrank and a first horizontal axis when in a firing position and said rail assembly and bellcrank as a unit to be pivoted about said platform support mountings whereby when the rail is in a stowed position the pivotal connection between the rail and the bellcrank member is located substantially forward of the pivotal connection between the bellcrank member and the platform and when the rail is in firing position the first-mentioned pivotal connection is located above the second-mentioned pivotal connection, the horizontal leg of said L-shaped bellcrank being provided with notches therein, latches fastened on the platform side member fittings for removably engaging said horizontal leg to retain said bellcrank in a position fixed with respect to said platform, and means associated with said rail assembly and the bellcrank for moving the rail to a predetermined angle of rotation with respect to the bellcrank member and for fixedly retaining said rail assembly at said predetermined angle, said last-mentioned means including a link pivotally connected to said rail assembly for rotation about a third horizontal axis and adapted to engage one of said notches on the horizontal leg of said L-shaped bellcrank.

References Cited in the file of this patent

UNITED STATES PATENTS

| | | |
|---|---|---|
| 757,825 | Maul | Apr. 19, 1904 |
| 1,341,386 | Schneider | May 25, 1920 |
| 1,580,344 | Stillians | Apr. 13, 1926 |
| 1,773,090 | Bluehdorn | Aug. 19, 1930 |
| 2,429,021 | Gould et al. | Oct. 14, 1947 |
| 2,532,643 | Richards | Dec. 5, 1950 |
| 2,568,455 | Lindvall et al. | Sept. 18, 1951 |

FOREIGN PATENTS

| | | |
|---|---|---|
| 436,932 | Italy | June 18, 1948 |